United States Patent [19]
Scales

[11] Patent Number: 5,535,355
[45] Date of Patent: Jul. 9, 1996

[54] CONTROLLER FOR A STORAGE DEVICE WHICH ALLOWS EITHER PRESTORED OR USER DEFINED FIRMWARE TO BE EXECUTED

[75] Inventor: William F. Scales, San Juan Capistrano, Calif.

[73] Assignee: Kabushiki Kaisha Toshiba, Kawagawa-ken, Japan

[21] Appl. No.: 679,179

[22] Filed: Mar. 27, 1991

Related U.S. Application Data

[63] Continuation of Ser. No. 333,974, Apr. 6, 1989, abandoned.

[51] Int. Cl.$^6$ .................................................. G06F 11/00
[52] U.S. Cl. ................... 395/428; 395/500; 364/DIG. 1; 364/243; 364/298.1; 364/262.8
[58] Field of Search ................... 364/200 MS File, 364/900 MS File; 360/32, 48, 33.1; 395/275, 725, 700, 575, 800, 426–430, 830, 500

[56] References Cited

U.S. PATENT DOCUMENTS

| | | | |
|---|---|---|---|
| 4,103,326 | 6/1978 | Shenfield | 364/200 |
| 4,590,557 | 5/1986 | Lillie | 364/200 |
| 4,651,237 | 3/1987 | Williams | 360/48 |
| 4,652,944 | 3/1987 | Tindall | 364/33.1 |
| 4,707,750 | 11/1987 | Anderson et al. | 360/71 |
| 4,736,341 | 4/1988 | Redmond et al. | 360/48 |
| 4,757,406 | 7/1988 | Stewart et al. | 360/49 |
| 4,799,145 | 1/1989 | Goss et al. | 364/200 |
| 4,947,318 | 8/1990 | Mineo | 364/200 |
| 4,951,249 | 8/1990 | McClung et al. | 364/900 |
| 5,005,089 | 4/1991 | Thanos et al. | 360/77.08 |
| 5,005,121 | 4/1991 | Nakada et al. | 364/200 |
| 5,016,121 | 5/1991 | Peddle et al. | 360/39 |
| 5,068,783 | 11/1991 | Tanagawa et al. | 395/575 |
| 5,101,490 | 3/1992 | Getson, Jr. et al. | 395/425 |

OTHER PUBLICATIONS

Apple II Disk System Installation Guide Apple Computer Co., Oct. 1982.

*Primary Examiner*—Mehmet B. Geckil
*Attorney, Agent, or Firm*—Cushman, Darby & Cushman

[57] ABSTRACT

A controller for a storage device allows either predefined firmware or user-defined firmware to be used. Initializing firmware is stored in a first memory, and is used to initialize the system. When a command is received, the user-defined firmware is checked before the original firmware to determine if the user has defined a more current version. If so, this user-defined firmware is used in place of the original firmware. The additional firmware can be changed in accordance with a special command which is different than the usual read/write command.

7 Claims, 6 Drawing Sheets

Fig. 3

| HEAD<br>TRACK | 0<br>(HEAD 44) | 1 | 2 | 3 ~ MAX HEAD |
|---|---|---|---|---|
| 0000 | DATA COPY | DATA SUB | FLAG | NOT USED |
| 0001<br>....<br>1212 | DATA ZONE (1212 CYL) | | | |
| 1213<br>....<br>1220 | ALTERNATE TRACK ZONE (8 CYL) | | | |
| 1221 | INVALID | | | |
| 1222<br>....<br>1223 | FIRMWARE SPACE | | | |
| 1224 | P-LIST | DRIVE PARAMETERS | DMT | NOT USED |
| 1225 | ECDT<br>I/O FIRMWARE | SUB DMT | G-LIST | NOT USED |

PROTECTED AREA

CONTROLLER FOR A STORAGE DEVICE WHICH ALLOWS EITHER PRESTORED OR USER DEFINED FIRMWARE TO BE EXECUTED

This is a continuation of application Ser. No. 07/333,974, filed on Apr. 6, 1989, which was abandoned upon the filing hereof.

BACKGROUND OF THE INVENTION

1. Field of the Invention

The present invention relates to a controller for a storage device, which is capable of modifying or customizing firmware for controlling I/O operations relating to the storage device.

2. Description of Related Art

Recently, a controller for controlling I/O operations of a magnetic disk drive, for example an SCSI (Small Computer System Interface) disk controller for a hard disk drive having a large capacity memory, has been equipped within the drive. The drive has ROM based firmware for controlling I/O operations thereof. When new functions are defined or customization is required, the ROM must be changed or a new one added. In addition, new firmware, which is stored in ROM, must be developed and tested at the factory without the benefit of customer application testing before the drive may be tested at the customer site.

Generally, as mentioned above, firmware in ROM must be changed when upgrading, modifying, or developing new firmware. These requirements cause the time for a production change to be long, and bring higher manufacturing/field support costs.

As a possible improvement, new firmware can be stored in external memory. However, such firmware can too easily be written over, for example by a conventional write command, since it is not specially protected. This also brings higher manufacturing/field costs as the external memory must be provided. Moreover the external memory causes deterioration in the functioning of a bus which connects a host system and the drive. Since, for example, an SCSI bus is limited as to the number of host systems and/or drives that can be connected to it, it is undesirable to provide such an external memory.

SUMMARY OF THE INVENTION

Accordingly, it is an object of the present invention to provide a controller for a storage device which is capable of modifying or customizing firmware for controlling I/O operations without a change of ROM.

It is a further object of the present invention to provide a controller for a storage device which reduces the time for production change, and manufacturing/field support costs.

It is a further object of the present invention to provide a controller for a storage device that does not degrade the functioning of a bus connecting a host system and the controller.

It is still a further object of the present invention to provide a controller for a storage device controlled by firmware that can be modified or customized, yet is protected from modification by conventional write commands for the storage device.

To achieve the objects and in accordance with the purpose of the invention as embodied and broadly described herein, the invention comprises an access mechanism for moving at least one read/write device and a medium relative to each other in accordance with an incoming access signal; a first memory unit for storing initializing firmware to initialize the storage device and the controller; a second memory unit for storing additional firmware for controlling the operations of the storage device; and a controlling unit for:

1) accessing the first memory unit and executing the initializing firmware, 2) accessing the second memory unit and executing the additional firmware, 3) generating the access signal and providing it to the access mechanism to accomplish a read/write operation in response to a read/write command, and 4) changing the additional firmware in accordance with a special change command different from the write command.

BRIEF DESCRIPTION OF THE DRAWINGS

FIG. 3 shows the organization of the medium of the present invention;

DETAILED DESCRIPTION OF THE PREFERRED EMBODIMENTS

A controller for a storage device in accordance with the present invention will be explained below in conjunction with, for example, a SCSI disk controller for a hard disk drive by referring to the accompanying drawings.

Figure 1:
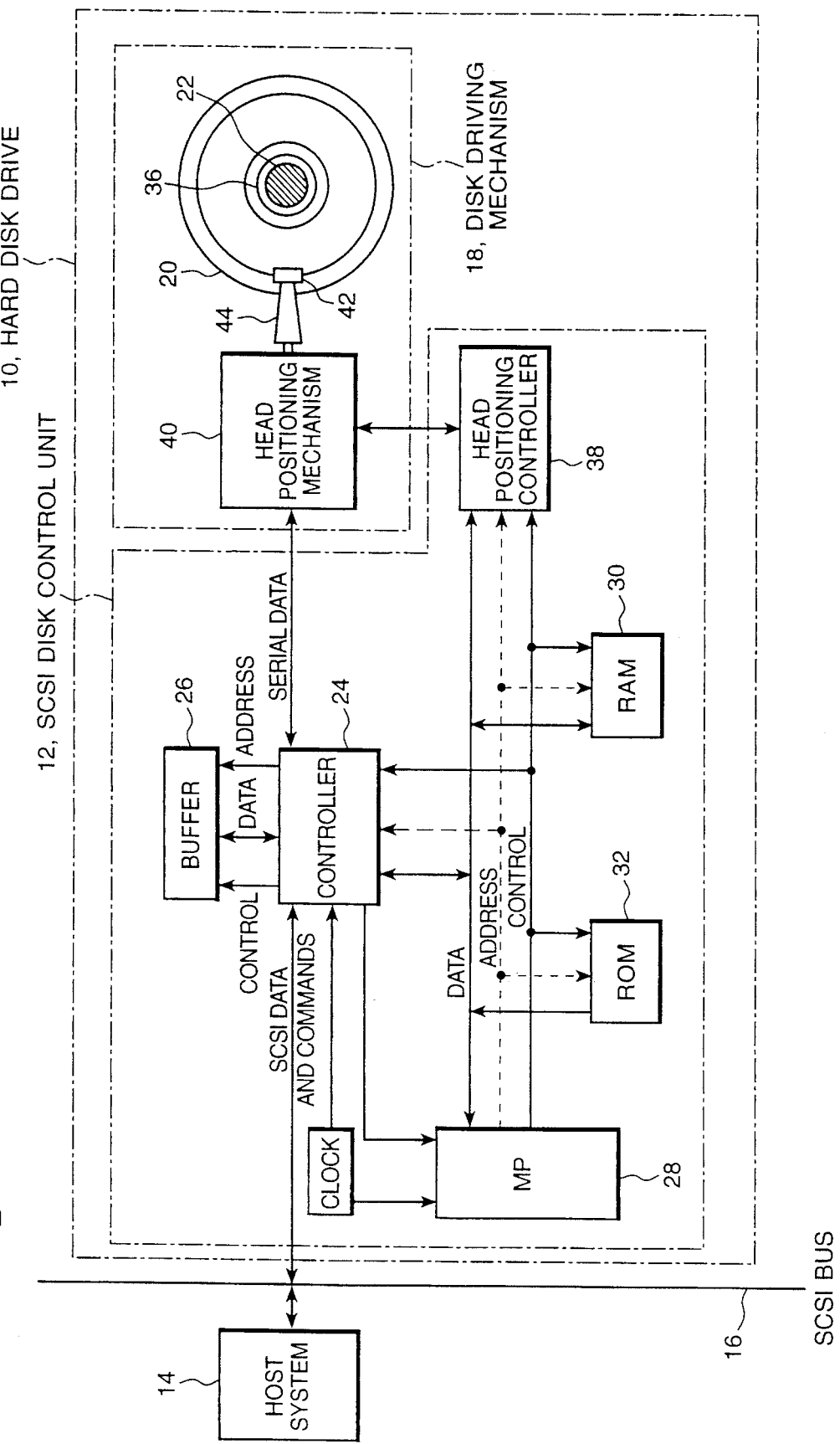
FIG. 1 is a block diagram of a disk controller for a magnetic disk drive according to one embodiment of the present invention.
Figure 2:
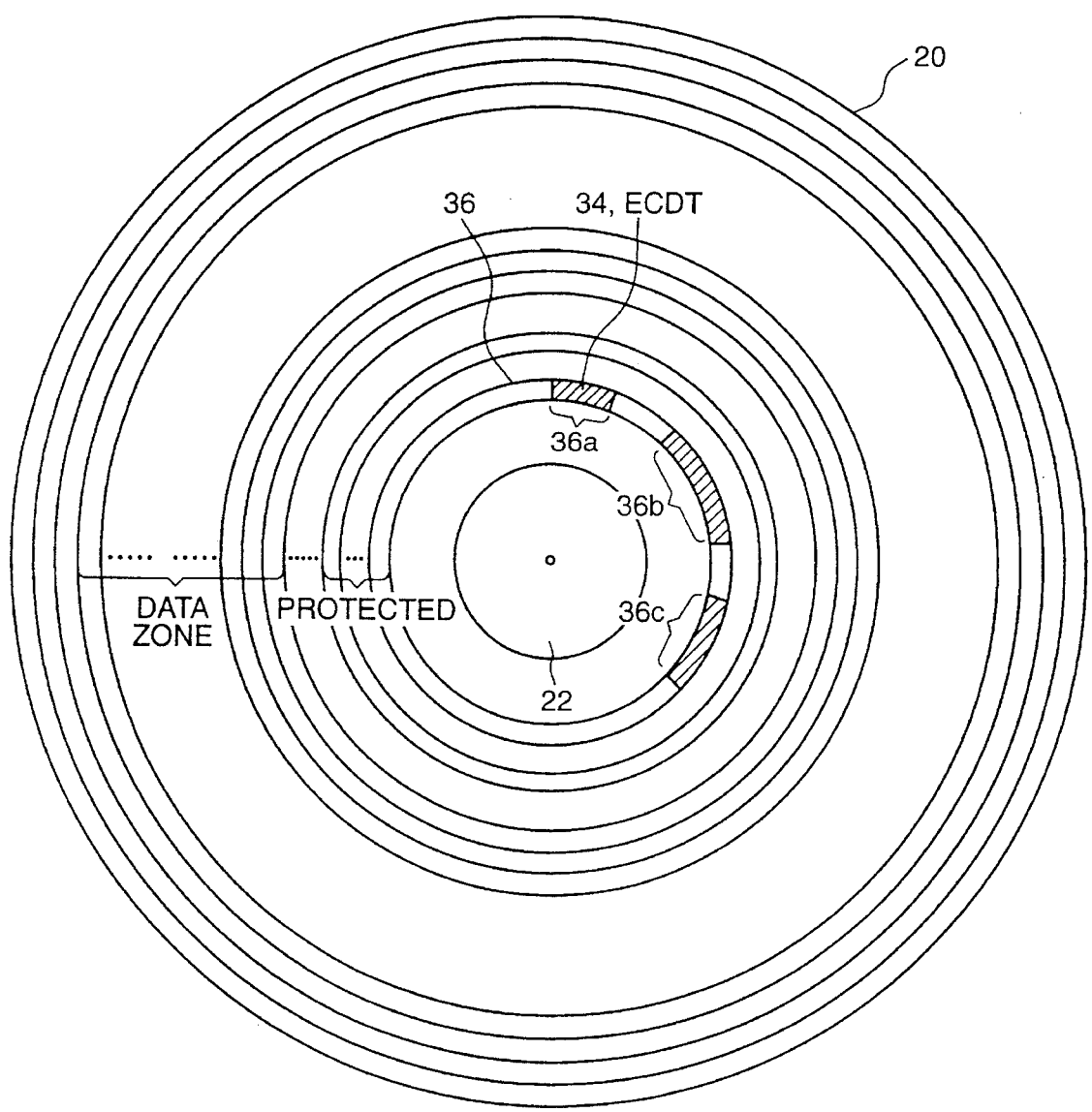
FIG. 2 is a schematic view of the disk of the present invention.

The controller according to one embodiment of the present invention will be explained below with reference to FIGS. 1 and 2.

A hard disk drive 10 is equipped with a SCSI disk control unit 12 and a disk driving mechanism 18. The disk control unit 12 receives SCSI data and commands from a host system 14 through an SCSI bus 16. The disk driving mechanism 18 has at least one magnetic disk 20 driven by a drive shaft 22 of a spindle motor. Other internal disks are attached to drive shaft 22, but not shown.

The SCSI disk control unit 12 includes a controller 24, which provides the functions of a dual-port buffer controller, a SCSI interface controller, and a serializer/deserializer for the disk drive. The dual-port buffer controller function generates the control signals for a FIFO buffer 26. FIFO buffer 26 is a dynamic random access memory (DRAM) with parity which is firmware configured as a simple FIFO of 64K bytes. It provides a minimum of one track of buffering between the SCSI bus 16 and the medium. Also the buffer 26 provides storage for a response to an inquiry command and for a response to a mode sense command.

The SCSI interface controller function of controller 24 provides an interface between the buffer 26 and the SCSI bus 16. Both synchronous (5 MBytes/sec.) and asynchronous (1.5 MBytes/sec.) transfers are supported under firmware control. The SCSI bus 16, which has the ability of connecting eight host systems and/or drives in total, is capable of transferring, for example, 5 MBytes per second maximum in the synchronous mode and 1.5 MBytes per second in the asynchronous mode. The band width of the buffer 26 and controller 24 is 5 MBytes per second with a 20 MHz clock. That is, 5 MBytes per second when reading or writing to the host without serial data from the disk 20. When reading from the disk 20 into the buffer 26 and writing to the host 14 from the buffer 26, the performance of SCSI bus 16 is 3.2 MBytes per second with a 15 MHz serial data transfer rate.

The SCSI disk control unit 12 also includes a random access memory (RAM) 30 and a read only memory (ROM) 32. After power-on, RAM 30 stores an executable command directory table (herein called an ECDT) 34 and firmware which had been recorded on portions of a prescribed track, for example recorded on each prescribed area 36b and 36c of innermost track 36 of the disk 20. This firmware is for controlling I/O operations of hard disk drive 10. Controller firmware in ROM 32 has the ability to modify, upgrade or execute new modules, (downloaded from the host on the SCSI bus 16), store them on the disk 20, load them into RAM 30 and transfer execution to them as required. ROM 32 also stores firmware for initializing the drive 10 and performing other I/O operations. The firmware distinguishes original modules in ROM 32 from upgraded or modified versions in RAM 30.

The ECDT 34 stores information concerning whether each firmware module is stored in RAM 30, ROM 32, disk 20 or other internal media.

The track 36 stores ECDT 34 in the area 36a, user-specified firmware in the area 36b and original manufacturer-specified firmware in the area 36c. This portion of disk 20 is write protected. Therefore the track 36 is not allowed to be written in by conventional commands, especially by the normal write command. This area, including the track 36 and some tracks close to it, is allowed to be written in only when a special command, for example a write buffer command, is sent from the host system 14, and only when initializing at power-on.

The controller 24 provides intelligence for the transfer of executable code from the SCSI bus 16 to the write protected medium, and then at power-up, reads the code into RAM 30 as required for execution. The executable code is stored at multiple locations on the user write protected medium to ensure the integrity of the stored executable code.

As a head positioning controller 38 receives a command from micro-processor 28, the head positioning controller 38 generates a head positioning control command to a head positioning mechanism 40 for moving a magnetic head 42, which is supported on a cartridge 44, to a destination track of the disk 20.

Each surface of the disk 20 has 1226 tracks which are arranged in concentric circles. Each track has servo information to position the head on a destination track exactly. Track number is defined such that the number of an inner track is always larger than that of an outer one. The outermost track is numbered track 0000. Track 0001 to track 1212 form a data zone. These tracks can be accessed and read or written in by conventional commands, for example by normal read/write commands. Track 1222 to track 1225 form a write protected area. Therefore, this area can not be written in using normal seek operations as mentioned above.

The manner in which data is stored on disk 20 is illustrated in FIG. 3. The uses of tracks 0000, 1224 and 1225 are as follows:

1. Cylinder 0 head 0–DATA COPY

This track or cylinder as it is commonly called is used to maintain a copy of the track or portion of a track that is in reassignment to another area of the disk, because of detection of a defect in the medium of the disk, for example.

2. Cylinder 0 head 1 - DATA SUB

This cylinder is used to as an alternate for the data copy cylinder.

3. Cylinder 0 head 2 - FLAG

This cylinder is used to record the address of the track or sectors that are in the process of reassignment. The flag cylinder is tested for reassignment in progress during power-on initialization. The flag cylinder is set before starting reassignment and is cleared after a successful reassignment.

4. Cylinder 1224 head 0 - P-LIST

This cylinder is used to record the location on the disk of medium defects which are identified during the manufacturing process.

5. Cylinder 1225 head 2 - G-LIST

This cylinder is used to record the location of medium defects which are identified during the life of the drive.

6. Cylinder 1224 head 2 - DMT

This cylinder maintains a copy of the current defect management table including, the P-List, G-List and user defined defects.

7. Cylinder 1225 head 1 - SUB DMT

This cylinder maintains a copy of the old DMT while the new DMT is being updated during reassignment.

Figure 4:
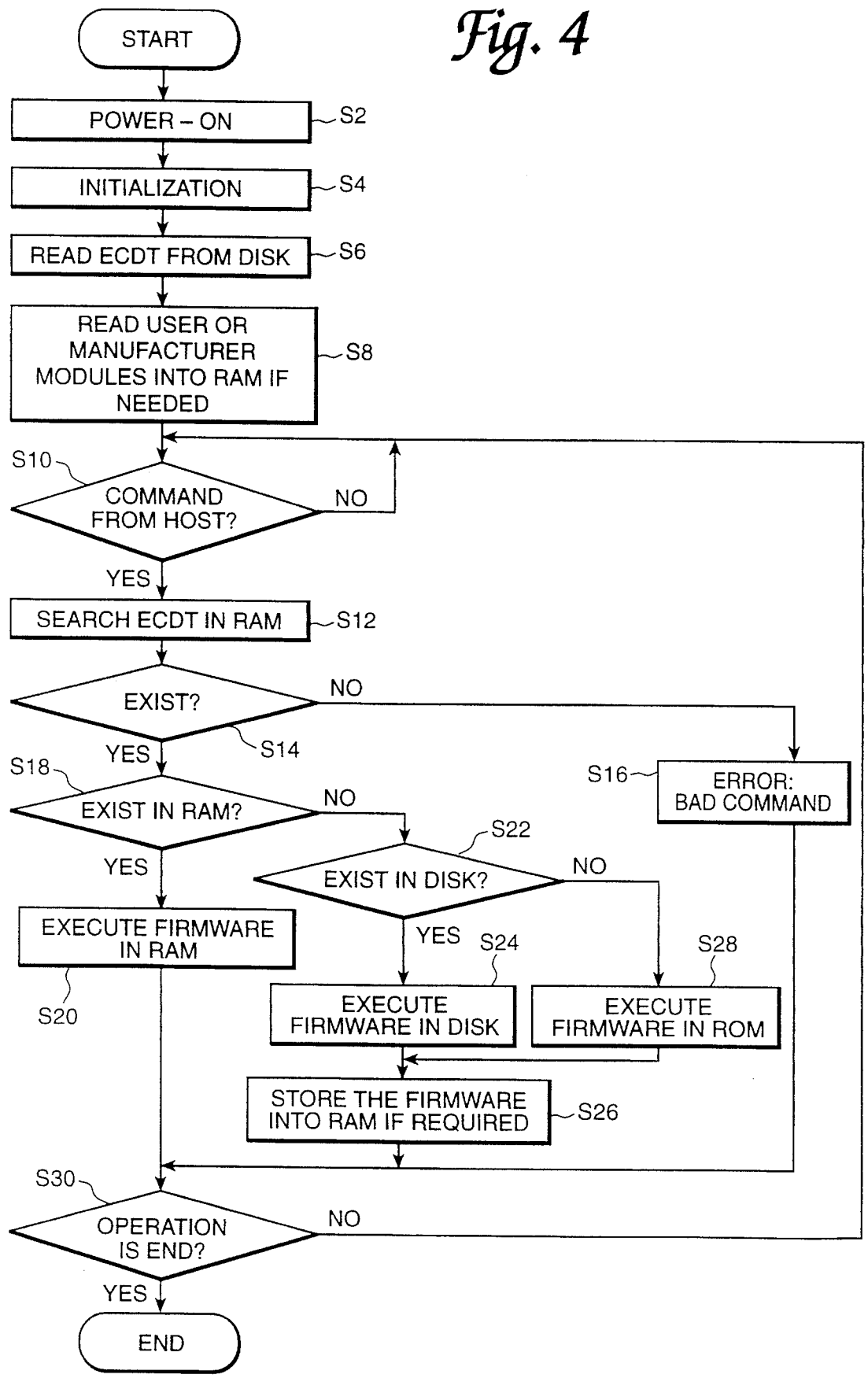
FIG. 4 is a flow chart illustrating the operation of executable firmware of the present invention.
Figure 5:
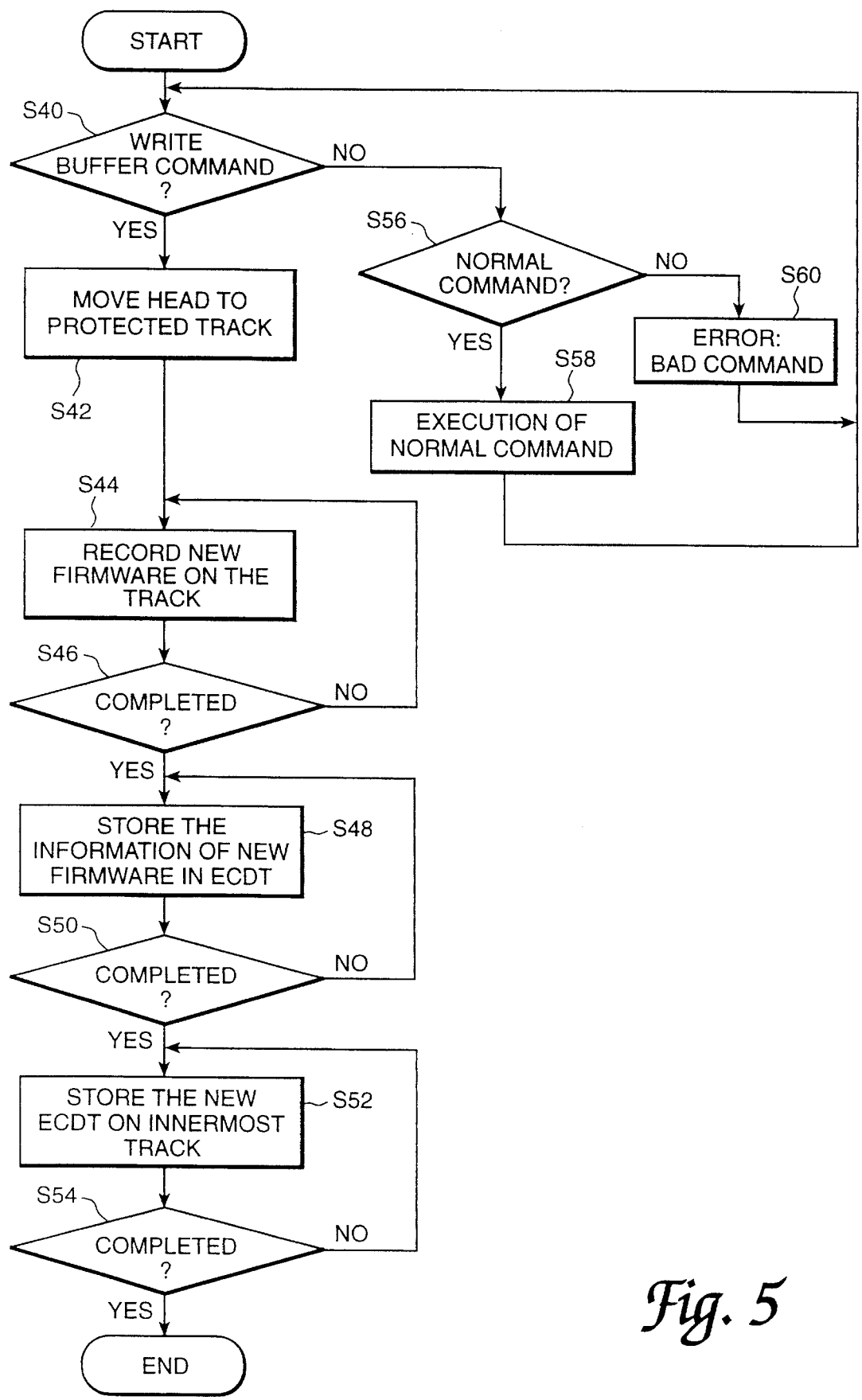
FIG. 5 is a flow chart illustrating the operation of recording new firmware in the present invention.

The operation of the embodiment will be described with reference to FIGS. 4 and 5.

At power-on in step S2 (see FIG. 4), initialization of hard disk drive 10 is performed by micro-processor 28 which executes initializing firmware from ROM 32 in step S4, and loads ECDT 34 from disk 20 to RAM 30 in step S6. Also executable modules from the medium 20 are loaded in RAM 30, if needed, in step S8. After the initialization, disk control unit 12 is maintained in a ready state to receive orders from the host system 14.

When the host system 14 sends a command to controller 24 in step S10, micro-processor 28 receives the command from controller 24. Therefore, micro-processor 28 begins to search the ECDT in RAM 30 for the position of the command module for executing the command in step S12. If the ECDT shows the command does not exist in RAM 30, ROM 32, or disk 20, micro-processor 28 judges the command to be invalid in step S16. Therefore, micro-processor 28 returns a message to the host 14. If the ECDT shows that the command is stored in RAM 30 in step S18, micro-processor 28 executes the command module firmware in step S20.

If the ECDT shows that the command is stored on the prescribed track 36 of the disk 20 in step S22, micro-processor 28 searches the disk 20. Micro-processor 28 sends a command to head positioning controller 38 so that head positioning mechanism 40 moves head 42 to the destination track. After micro-processor 28 finds the destination track, it reads and executes the firmware in step S24. If required, the firmware is stored in RAM 30 in step S26.

If the ECDT in RAM 30 shows that the command is stored in ROM 32 in step S22, then micro-processor 28 executes it in step S28 and transfers the firmware to RAM 30 if required.

If a user decides he can provide firmware that is better than or supplemental to the original software stored by the manufacturer in the area 36c of the disk 20, the user's firmware can be stored in the area 36b of the disk 20. Micro-processor 28 executes the user's firmware instead of the original firmware. If no user-defined firmware is stored on the protected track, other firmware, which is defined by the manufacturer and is stored in the area 36c, is executed.

When upgrading, modifying, or developing new firmware (see FIG. 5), host system 14 sends a special command, for example a write buffer command to controller 24 in step S40. This is sent by controller 24 to micro-processor 28 to move the head 42 to the protected track of the disk 20 in step S42. The new command module is recorded on the track of the disk 20 by disk drive 20 in steps S44, and S46 responsive to receiving the command. Also, a new ECDT is recorded in steps S48 to S54. The old ECDT in RAM 30 is replaced by the new ECDT so that the new command can be searched for.

As mentioned above, not only the ECDT but also some executable firmware is stored in RAM 30. If an attempt is made to store firmware in RAM 30 when it is full, the firmware which is used least frequently is shifted to a different media.

Figure 6:
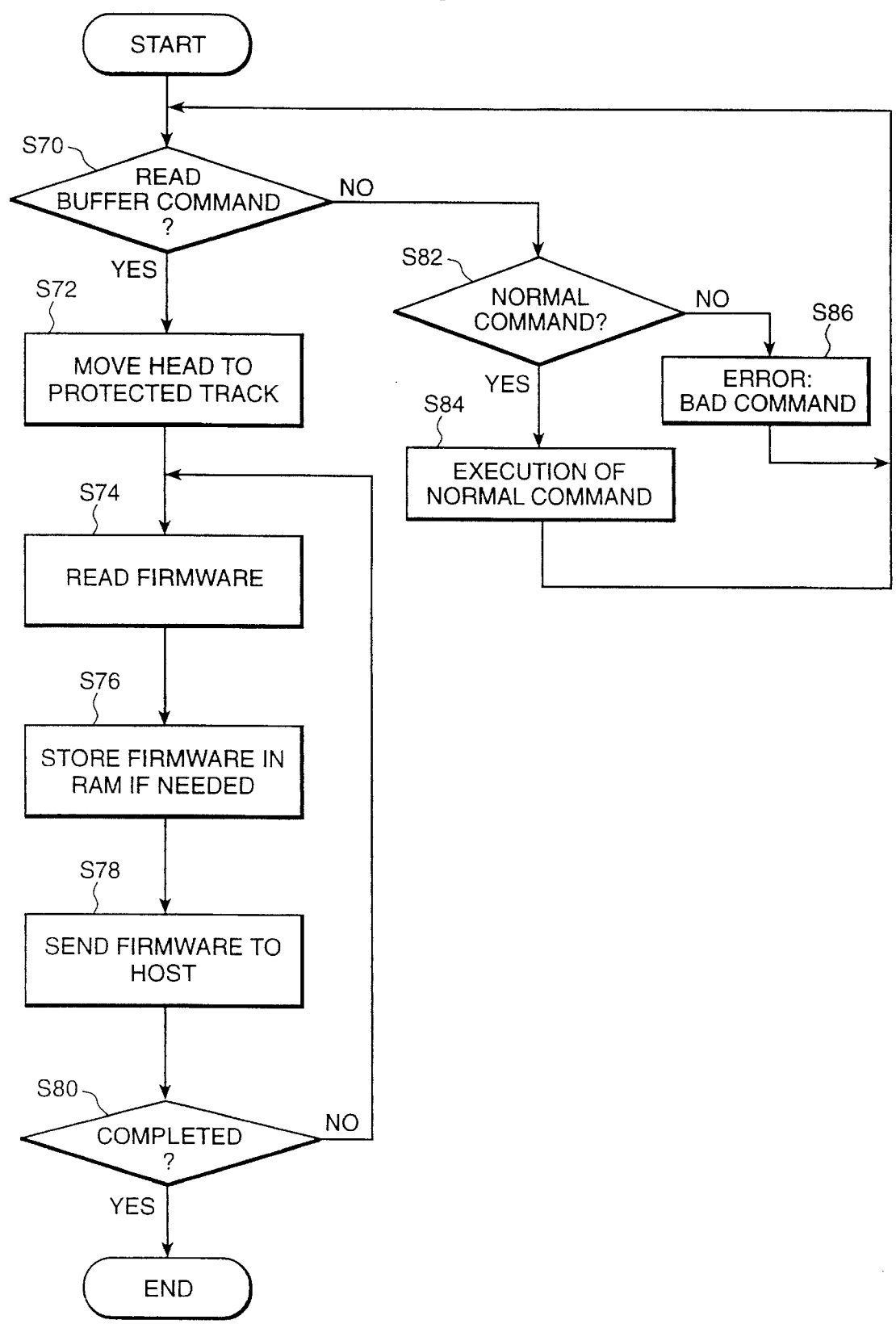
FIG. 6 is a flow chart illustrating the operation of reading firmware stored on disk in the present invention.

When a user desires to read the firmware stored in the protected area of the disk 20 (see FIG. 6.), host system 14 can send a special command, for example a read buffer command, different from a conventional read command, to controller 24 in step S70. After head positioning mechanism 40 moves the head 42 to a destination track of the disk 20 in accordance with a head positioning control signal in step S72, the head 42 reads the firmware and sends it to the host system 14 through controller 24 in steps S74 to S80. Therefore the user can confirm the contents of the firmware with a display device (not shown) of the host system 14.

In the aforementioned embodiment, it is possible for a user of the hard disk drive to easily modify or customize the firmware without changing ROMs. The user can write a user-specified firmware on the medium incorporated within the disk drive. Further, the disk drive of the present invention includes a RAM for executing medium resident firmware. The user-specified firmware recorded on the medium can be loaded into the RAM so that a micro-processor in the drive, which controls the drive by executing the firmware, can execute the user-specified firmware. Therefore, the user easily makes the drive additionally have user-specified or customized operations without changing the ROM itself.

Therefore it is possible to change firmware rapidly, and to reduce the time for production changes and manufacturing/field support costs. It is also possible to prevent deterioration in the functioning of the bus connecting the host and the drive.

As an alternative to the above approach employing special read/write commands, it is also possible to employ a prescribed password. When the password is input, the next conventional command which is input, for example a read/write command, is regarded as a special command. This would allow the protected area to be accessed, and read/write into.

Although, in the above-mentioned embodiment, the controller has been explained in conjunction with a hard disk drive, it will be obvious that the present invention can be adapted for a floppy disk drive or an optical disk drive or the like. The present invention can be changed or modified in a variety of ways without departing from the spirit and scope of the present invention, and such modifications are intended to be included within this invention as defined by the following claims.

What is claimed is:

1. Apparatus for controlling a storage device, having a medium on which data may be written and read by at least one read/write device, comprising:

access means for moving at least one of said read/write device and said medium relative to each other, said moving being in accordance with an incoming access signal;

first memory means, coupled to said storage device, for storing initializing firmware;

second memory means, coupled to said storage device, for storing additional firmware; and controller means, coupled to said access means and said first and second memory means, for:
   1) accessing said first memory means and executing said initializing firmware,
   2) accessing said second memory means and executing said additional firmware,
   3) generating said access signal and providing it to said access means for a read/write operation in response to a read/write command, and
   4) changing said additional firmware stored in said second memory means in accordance with a special change command different from said read/write command; wherein said initializing firmware is for initializing said storage device and said controller means; and said additional firmware is for controlling operations of said storage device.

2. Apparatus according to claim 1, wherein said second memory means includes:

a portion of said medium for storing said additional firmware, said portion of said medium being accessed by said access means in response to commands for said additional firmware from a user; and random access memory means for storing said additional firmware transferred from said portion of said medium.

3. Apparatus according to claim 2, wherein said read/write command cannot cause said access means to read/write on said portion of said medium.

4. Apparatus according to claim 1, further comprising table means, coupled to said first means for storing information concerning whether firmware for each possible storage device operation is stored in said first memory means or said second memory means, said controller means changing said information stored in said table means when said controller means performs said changing function.

5. A method for controlling a storage device having a medium on which data may be written and read by at least one read/write device, comprising the steps of:

executing initializing firmware to initialize said storage device;

generating an access signal and providing it to said read/write device in response to a read/write command;

moving at least one of said read/write device and said medium relative to each other in accordance with said access signal to perform a read/write operation;

executing additional firmware, which is stored in a portion of said medium accessed and written by a special change command, different from said read/write command, to control operations of said storage device; and changing said additional firmware in accordance with said special change command.

6. Apparatus for a storage device having a medium on which data may be written and read by at least one read/write device, comprising:

access means for moving at least one of said read/write device and said medium relative to each other in accordance with an incoming access signal;

memory means, including a first memory portion for storing initializing firmware, and a second memory portion; and controller means, coupled to said access means and to said memory means, responsive to an instruction to be executed by firmware, for:
1) accessing said second memory portion to determine if said instruction is stored therein and executing said instruction if so;
2) accessing said first memory portion only if said instruction is not stored in said second memory portion and executing said instruction in said first memory portion if so;
3) generating said access signal and providing it to said access means for a read/write operation in response to a read/write command, and
4) changing said additional firmware stored in said second memory portion in accordance with a special change command different from said read/write command, wherein said initializing firmware is for initializing said storage device and said controller means; and said additional firmware is for controlling operations of said storage device.

7. Apparatus according to claim 6, further comprising random access memory means for storing said instruction executed from one of said memory portions.

* * * * *